United States Patent
Peart et al.

(10) Patent No.: US 9,460,258 B2
(45) Date of Patent: Oct. 4, 2016

(54) SHAPING INTEGRATED WITH POWER NETWORK SYNTHESIS (PNS) FOR POWER GRID (PG) ALIGNMENT

(71) Applicant: Synopsys, Inc., Mountain View, CA (US)

(72) Inventors: David L. Peart, Round Rock, TX (US); Yan Lin, Pleasanton, CA (US); Aiguo Lu, San Jose, CA (US); Balkrishna R. Rashingkar, San Jose, CA (US); Russell B. Segal, Sunnyvale, CA (US); Peiqing Zou, San Jose, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 14/141,207

(22) Filed: Dec. 26, 2013

(65) Prior Publication Data
US 2014/0181773 A1    Jun. 26, 2014

Related U.S. Application Data

(60) Provisional application No. 61/746,060, filed on Dec. 26, 2012.

(51) Int. Cl.
G06F 17/50    (2006.01)

(52) U.S. Cl.
CPC ....... *G06F 17/5072* (2013.01); *G06F 2217/78* (2013.01); *Y02E 60/76* (2013.01); *Y04S 40/22* (2013.01)

(58) Field of Classification Search
CPC .............. G06F 17/5072; H01L 2224/73265
USPC .................................. 716/100, 120
See application file for complete search history.

(56) References Cited

U.S. PATENT DOCUMENTS

| | | | |
|---|---|---|---|
| 6,271,548 B1 * | 8/2001 | Umemoto et al. | 257/202 |
| 7,353,490 B2 | 4/2008 | Jiang et al. | |
| 8,037,441 B2 * | 10/2011 | Ringe et al. | 716/119 |
| 8,086,985 B2 * | 12/2011 | Qiu | 716/119 |
| 8,245,172 B2 | 8/2012 | Hsu | |
| 8,495,547 B2 | 7/2013 | Keinert et al. | |
| 8,513,978 B2 | 8/2013 | Sherlekar | |
| 8,572,541 B2 * | 10/2013 | Singh et al. | 716/120 |
| 8,635,572 B1 * | 1/2014 | Jin et al. | 716/120 |
| 2007/0033562 A1 * | 2/2007 | Correale et al. | 716/10 |
| 2009/0271752 A1 * | 10/2009 | Alpert et al. | 716/9 |
| 2010/0077374 A1 * | 3/2010 | Qiu | 716/17 |
| 2011/0107286 A1 | 5/2011 | Batterywala | |
| 2012/0060138 A1 * | 3/2012 | Singh et al. | 716/120 |
| 2012/0290996 A1 * | 11/2012 | Law et al. | 716/127 |

\* cited by examiner

*Primary Examiner* — Suchin Parihar

(74) *Attorney, Agent, or Firm* — Park, Vaughan, Fleming & Dowler LLP; Laxman Sahasrabuddhe (57) ABSTRACT

Embodiments are described in which shaping is integrated with power network synthesis (PNS) for power grid (PG) alignment. Specifically, some embodiments create placement constraints based on the PG that is expected to be created by PNS, and then perform shaping (or perform legalization) on the circuit design based on the placement constraints. This ensures that the physical partitions (e.g., instances of multiply-instantiated-blocks) are aligned with the power grid during shaping.

18 Claims, 6 Drawing Sheets

SHAPING INTEGRATED WITH POWER NETWORK SYNTHESIS (PNS) FOR POWER GRID (PG) ALIGNMENT

RELATED APPLICATION

This application claims priority to U.S. Provisional Application Ser. No. 61/746,060, entitled "Shaping integrated with power network synthesis (PNS) engine for power grid (PG) alignment," by inventors David Peart, Yan Lin, Aiguo Lu, Vineet Rashingkar and Russ Segal, filed on 26 Dec. 2012, the contents of which are herein incorporated by reference in their entirety for all purposes.

BACKGROUND

1. Technical Field

This disclosure relates to electronic design automation (EDA). More specifically, this disclosure relates to shaping integrated with power network synthesis for power grid alignment.

2. Related Art

Advances in process technology and a practically unlimited appetite for consumer electronics have fueled a rapid increase in the size and complexity of integrated circuit (IC) designs. The performance of circuit design flows is very important because it reduces the time to market for IC designs.

Shaping refers to a step in a circuit design flow in which the shapes, sizes, and/or locations of physical partitions (also known as blocks) in the circuit design are determined. A power grid (PG) refers to the circuitry that supplies power and ground voltages to circuit elements in a circuit design. Power network synthesis (PNS) refers to a step in a circuit design flow in which the PG is created for the circuit design.

In a typical circuit design flow, shaping is performed much before PNS. This makes it very difficult to create a PG network that is consistent with the shapes, sizes, and locations of the physical partitions that were determined during shaping.

SUMMARY

Some embodiments described herein provide systems and techniques for performing shaping on a circuit design based on placement constraints that are generated based on the structure of the PG. This enables the shaping engine to align physical partitions with the PG.

In some embodiments, a system (e.g., a computer) can receive a set of PG strategies (the set of PG strategies can include one or more PG strategies) that specifies a structure of a PG that is to be used in a circuit design. The system may receive an alignment option which indicates the type of alignment that is required, and the system may also receive information about metal layers. In some embodiments, the set of PG strategies can specify a start point, a pitch, a direction, and a repeat count for creating the PG. Next, the system can create a set of placement constraints based on the set of PG strategies (and optionally also based on the alignment option and/or the metal layer information), wherein the set of placement constraints is used during shaping.

The system can then perform shaping on a circuit design using the set of placement constraints. The set of placement constraints can include: (1) a placement constraint that requires a centerline of a physical partition, e.g., an instance of a multiply-instantiated-block (MIB), to be aligned with a centerline of a PG wire, (2) a placement constraint that requires a given edge of a physical partition to have a given offset with respect to a PG wire, and/or (3) a placement constraint that requires a reference point (e.g., a given corner) in a physical partition to align with a grid point of a grid.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the one or more inventions disclosed herein are not limited to the embodiments shown, but are to be accorded the widest scope consistent with the principles and features disclosed herein.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that is desired to be implemented. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools.

The netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, etc.

During resolution enhancement, geometric manipulations can be performed on the layout to improve manufacturability of the design. During mask data preparation, the design can be taped-out to produce masks which are used during fabrication.

Shaping Integrated with PNS for PG Alignment

In a typical circuit design flow, the shapes, sizes, and locations of the physical partitions are determined during shaping. In some cases, a physical partition may already have a predetermined shape and/or size (e.g., because the physical partition was constructed at some other time or place and is being inserted as-is into the current circuit design). In such situations, the "shaping" operation merely refers to determining a location for the physical partition (i.e., performing placement) so that the physical partition is aligned with the PG network. Next, macro and standard cells are placed in the physical partitions. Then, during PNS, a PG network is created, wherein PNS needs to make sure that the power and ground wires are properly aligned with the physical partitions. Finally, the PG network is provided to the physical partitions so that power and ground voltages can be supplied to the circuit elements in the physical partition.

It is difficult to ensure that the PG network is properly aligned with the physical partitions, and this task becomes even more difficult when the circuit design includes MIBs. A MIB is a physical partition that has multiple instances in the circuit design. A MIB can generally include any circuitry, e.g., a MIB can include circuitry for performing a particular function or a particular set of functions. For example, a processor core can be a MIB. Different instances of a MIB can have the same or different orientations, e.g., an instance of a MIB may be a rotated and/or a mirror image of another instance. When a circuit design includes MIBs, the PG network creation process has to consider all MIB orientations so that when the PG network is provided to the MIBs, the wires in the PG network are optimally located for supplying power and ground voltages to the circuit elements within the MIB instances.

Some embodiments described herein integrate shaping with PNS to facilitate PG alignment of physical partitions, e.g., MIB instances. Specifically, in some embodiments, the shaping engine is integrated with the PG network creation engine so that the shaping engine estimates the locations of wires in the user-specified PG network, and uses that information to help the shaping engine to shape and align the physical partitions. Integrating the shaping engine with the PNS engine enables shaping to provide the block shapes which satisfy the one or more user-specified PG strategies. The integration also enables the shaper to optimize the orientation of MIBs such that the PG network is symmetrical for the MIBs. Since the PG network creation step uses the same user-defined PG strategy that was assumed during shaping, the MIBs are already optimally or near-optimally aligned with the PG grid during PNS.

Figure 1:
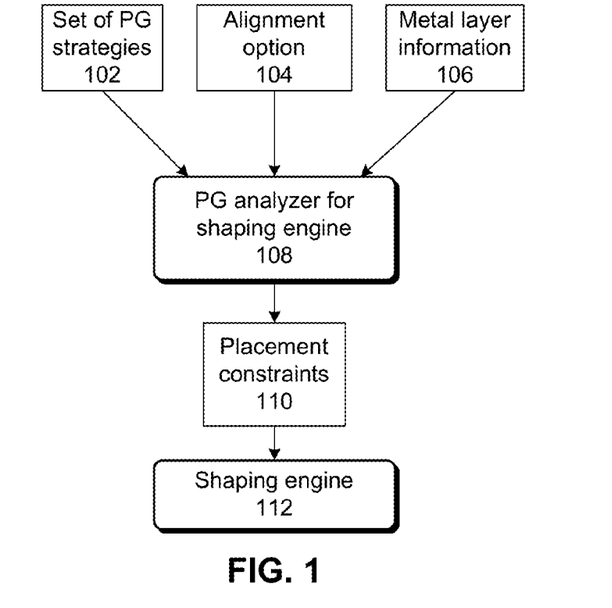
FIG. 1 illustrates how shaping can be integrated with PNS in accordance with some embodiments described herein.

FIG. 1 illustrates how shaping can be integrated with PNS in accordance with some embodiments described herein. PG analyzer for shaping engine 108 can receive three inputs: a set of PG strategies 102, alignment option 104, and metal layer information 106.

The set of PG strategies 102 specifies the structure of the power grid. For example, the set of PG strategies can specify the start point, pitch (i.e., distance between the centers of two wires), direction (i.e., horizontal or vertical), and the repeat count (i.e., the number of wires that are to be created). Some embodiments can specify the structure of the power grid using systems and techniques that are described in U.S. application Ser. No. 13/849,427, entitled "Pattern-based power-and-ground routing and via creation," by inventors Yan Lin, Yi-Min Jiang, Phillip H. Tai, and Lin Yuan, filed on 22 Mar. 2013, the contents of which are herein incorporated by reference in their entirety for all purposes.

Alignment option 104 specifies the type of alignment is to be used during shaping. For example, alignment option 104 may specify that the distance between a given edge of the physical partition and a power grid wire be equal to a given offset value. As another example, alignment option 104 may specify that the centerline of the physical partition be aligned with a grid line. As yet another example, alignment option 104 may refer to an alignment grid and require that a given corner (or any other reference point) of the physical partition or MIB instance that is being placed be located at one of the grid points in the alignment grid. Metal layer information 106 can specify, for example, the metal layers that will be used for creating the PG, and the preferred wire direction for each metal layer.

Based on these inputs, the PG analyzer for shaping engine 108 can generate a set of placement constraints 110 that are then used by shaping engine 112. Placement constraints 110 ensure that shaping engine 112 places the MIBs in locations that are aligned with the PG grid. In some embodiments, placement constraints 110 can be specified in the form of a grid. In these embodiments, shaping engine 112 places physical partitions (e.g., MIBs) so that one of the corners (or any user-specified reference point on the physical partition) is aligned with a grid point.

Figure 2:
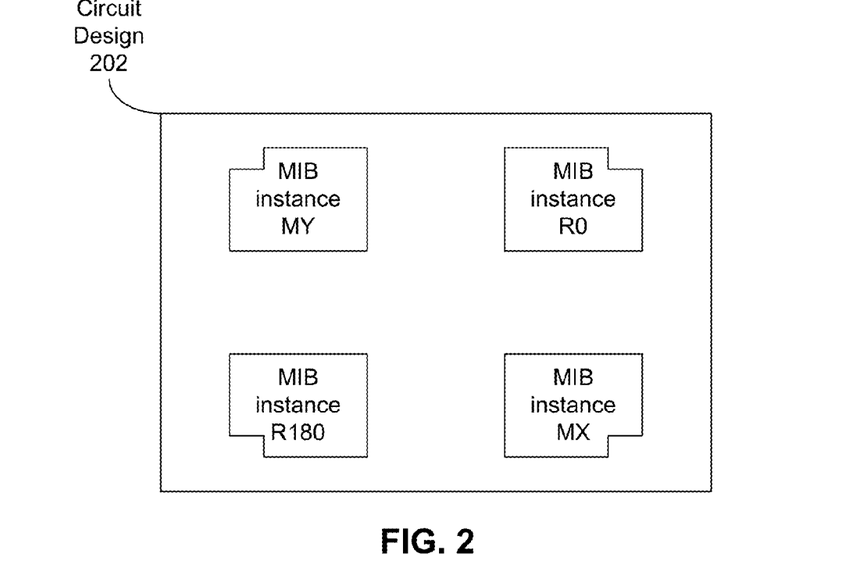
FIG. 2 illustrates an example of a circuit design with multiple MIB instances having different orientations in accordance with some embodiments described herein.

FIG. 2 illustrates an example of a circuit design with multiple MIB instances having different orientations in accordance with some embodiments described herein. Circuit design 202 includes four MIB instances with different orientations. MIB instance R0 can be the master MIB instance (the label "R0" refers to a rotation by 0°). MIB instance MY can be a mirror image of the master MIB instance along the Y axis, MIB instance MX can be a mirror image of the master MIB instance along the X axis, and MIB instance R180 can be a version of the master MIB instance that has been rotated by 180°.

In some embodiments, placement constraints 110 can include four different grids, wherein each grid corresponds to a particular orientation of the MIB instance. In these embodiments, when shaping engine 112 aligns each MIB instance (e.g., the four MIB instances shown in FIG. 2) by using the appropriate grid that corresponds to the orientation of the MIB instance.

Figure 3A:
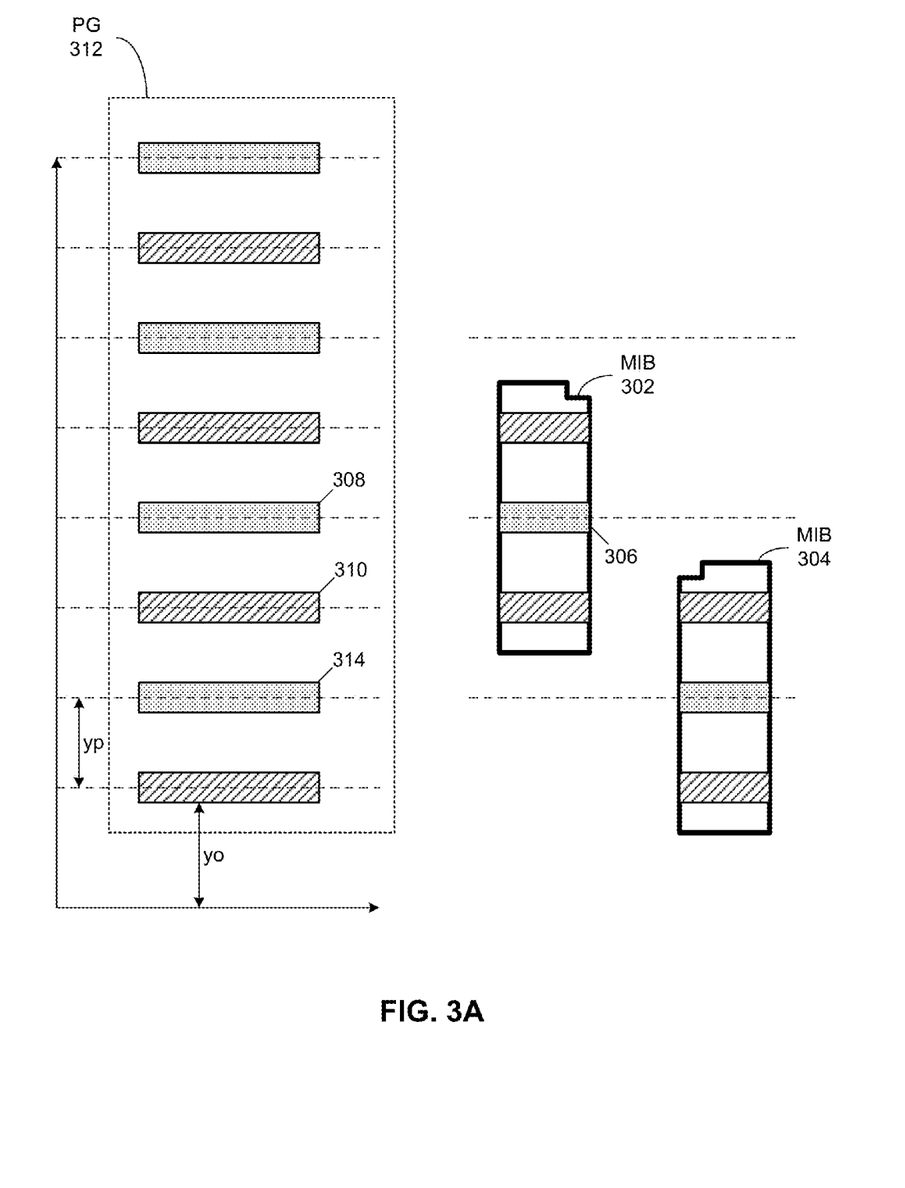
FIG. 3A illustrates an example of how a shaping engine can align a MIB instance using flippable-in-place alignment in accordance with some embodiments described herein.

FIG. 3A illustrates an example of how a shaping engine can align a MIB instance using flippable-in-place alignment in accordance with some embodiments described herein. A shaping engine can construct PG 312 based on the set of PG strategies provided by the user. The shaded wires, e.g., wires 308 and 314 can carry a power voltage (i.e., a supply voltage), and the crosshatched wires, e.g., wire 310, can carry a ground voltage.

PG 312 can be created based on the following user-specified PG strategy: Y-axis offset is "yo" (this indicates the start point), Y-axis pitch is "yp", direction is horizontal (this indicates the direction of the wires), and the repeat count is six. In this PG strategy, it is assumed that alternate wires carry power and ground voltages, respectively, and that the Y-axis pitch indicates the distance between the centerlines of a power wire and a ground wire. It will be apparent to one having ordinary skill in the art that other patterns can be used to specify the structure of the PG. For example, in other embodiments, the offset and pitch for the power and ground wires can be specified separately, and/or the power and ground wires may run along different directions (e.g., power wires can be in the vertical direction and ground wires can be in the horizontal direction).

Note that the shaping engine does not actually construct PG 312 in the circuit design, i.e., the wires in PG 312 are not part of the circuit design as yet. Instead, the shaping engine creates a representation of PG 312 that can then be used for aligning MIB instances with PG 312 during shaping. The power grid will be added to the circuit design during PNS which, as explained above, is a step that is usually performed later (i.e., later with respect to shaping) in the design flow.

Once PG 312 has been created, the shaping engine can then place MIB instances in accordance with the type of alignment that was specified in alignment option 104. For example, FIG. 3A illustrates how MIB instances can be placed in accordance with a flippable-in-place alignment option. In this alignment option, the centerline of the MIB instance is aligned with the centerline of a PG wire that carries a power voltage. For example, centerline of MIB instance 302 is aligned with the centerline of PG wire 308 that carries a power voltage. This alignment example is for illustration purposes only and is not intended to limit the scope of this disclosure. In another example, the centerline of the MIB instance may be aligned with the centerline of a PG wire that carries a ground voltage.

Wire 306 illustrates the location of PG wire 308 inside MIB instance 302 (the locations of other wires within the MIB instances have also been shown in FIG. 3A). Note that, flipping MIB instance 302 along the X-axis or Y-axis (i.e., creating a mirror image with respect to the X-axis or Y-axis) does not change the relative positioning of the PG wires inside of MIB instance 302 because the locations of the PG wires within MIB instance 302 are symmetric with respect to the centerline of MIB instance 302. For example, MIB instance 304 is a flipped version of MIB instance 302 (MIB instance 304 is a mirror image of MIB instance 302 with respect to the Y-axis). The shaping engine can place MIB instance 304 so that the centerline of MIB instance 304 is aligned with the centerline of PG wire 314.

Figure 3B:
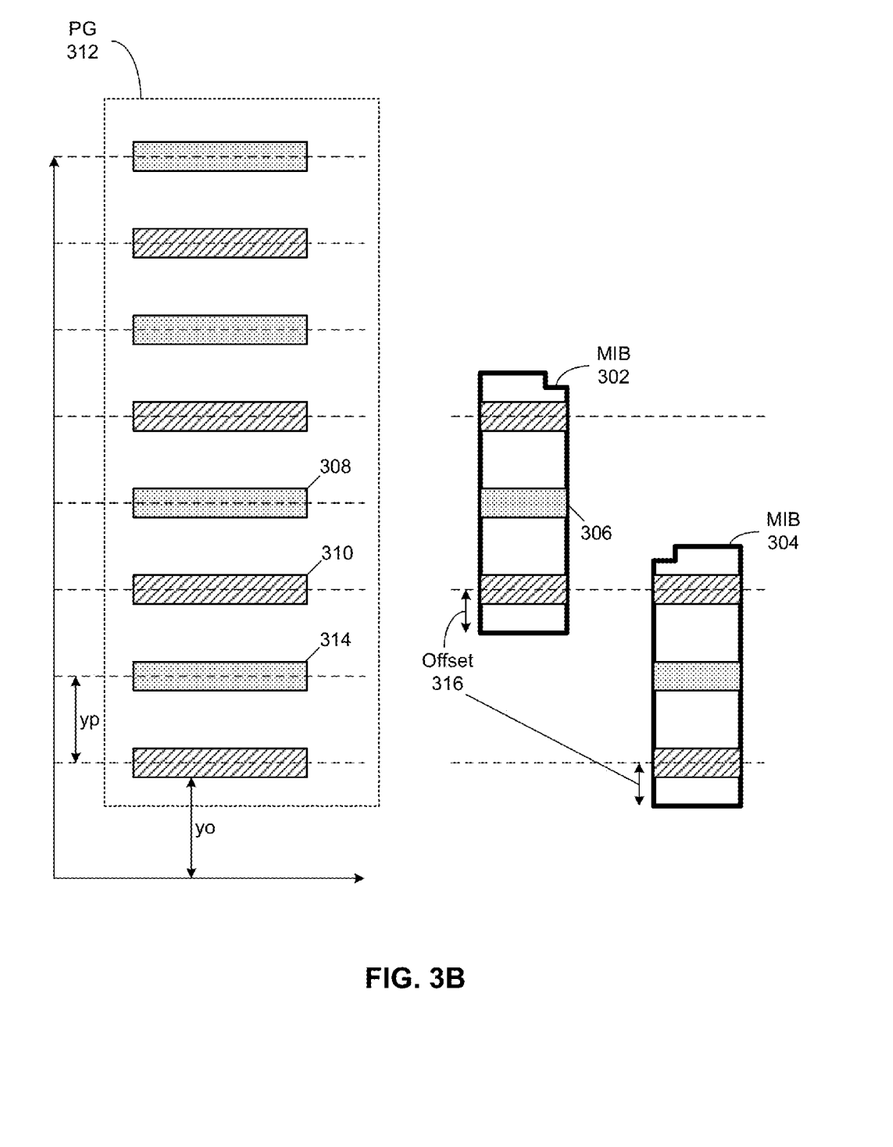
FIG. 3B illustrates an example of how a shaping engine can align a MIB instance using fixed-offset-from-boundary alignment in accordance with some embodiments described herein.

FIG. 3B illustrates an example of how a shaping engine can align a MIB instance using fixed-offset-from-boundary alignment in accordance with some embodiments described herein. In this alignment option, MIB instance 302 is aligned with the PG wires so that the distance between a particular edge of MIB instance 302 and the centerline of a PG wire that carries ground voltage is a fixed offset value. For example, the distance between the bottom edge of MIB instance 302 and the centerline of PG wire 310 that carries a ground voltage is equal to the fixed offset 316. This alignment example is for illustration purposes only and is not intended to limit the scope of this disclosure. In another example, a particular edge of the MIB instance may be aligned with an offset with respect to the centerline of a PG wire that carries a power voltage. As shown in FIG. 3B, MIB instance 304 can likewise be aligned with another ground wire.

Figure 4A:
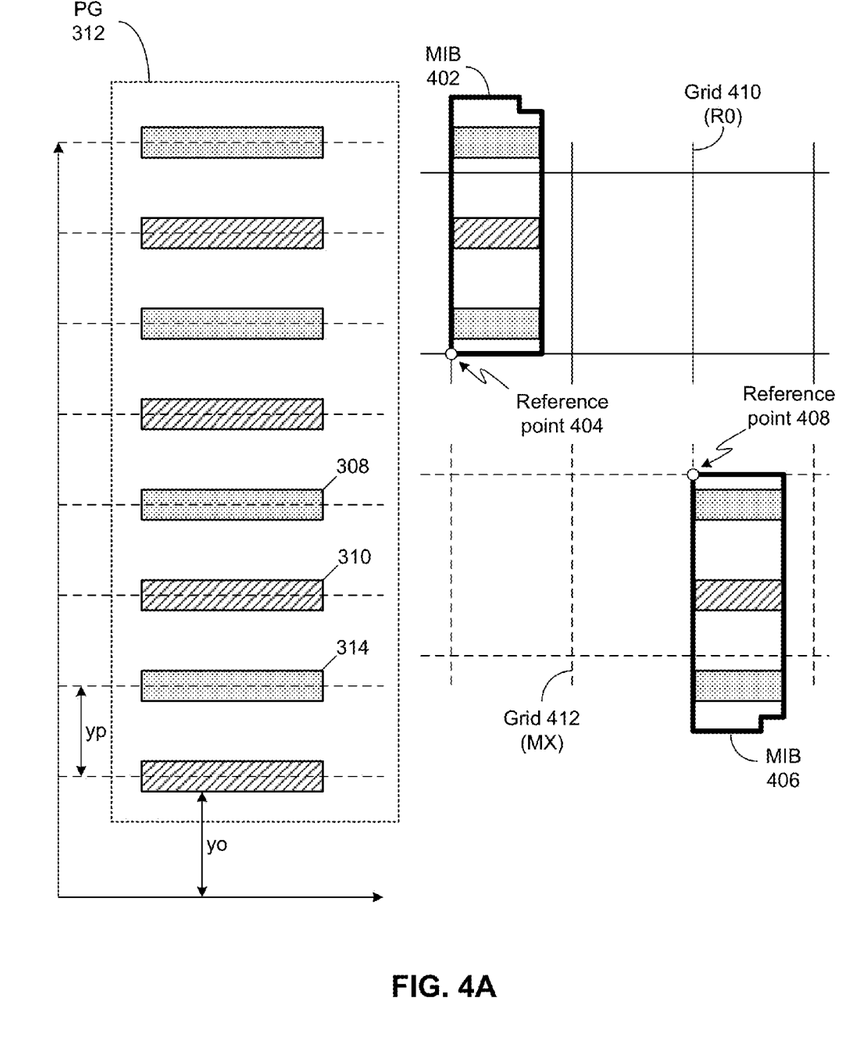
FIG. 4A illustrates an example of how a shaping engine can align a MIB instance using multiple grids in accordance with some embodiments described herein.

FIG. 4A illustrates an example of how a shaping engine can align a MIB instance using multiple grids in accordance with some embodiments described herein. In some embodiments, the placement constraints can be specified using multiple grids. Specifically, the shaping engine can place a physical partition (e.g., a MIB instance) so that a given reference point on the physical partition (e.g., a particular corner of the physical partition) is located at a grid point. Note that different orientations of a MIB may need to be placed using different grids. For example, as shown in FIG. 4A, grid 410 can specify the grid points (each intersection point in grid 410 can be a grid point) that are to be used when placing a MIB instance that has an R0 orientation (i.e., a MIB instance that is rotated by 0°), and grid 412 can specify the grid points that are to be used when placing a MIB instance that has an MX orientation (i.e., a MIB instance that is a mirror image with respect to the X-axis). Similarly, other grids can be provided to the shaping engine for other orientations, e.g., for R180 and MY orientations. MIB 402 has an R0 orientation and so it has been placed using grid 410 by aligning reference point 404 in MIB 402 with a grid point in grid 410. MIB 406 has an MX orientation and so it has been placed using grid 412 by aligning reference point 408 with a grid point in grid 412. Note that reference points 404 and 408 are at the same relative location on the MIB (reference point 404 is at the bottom-left corner in the R0 orientation which is equivalent to the top-right corner in the MX orientation).

Figure 4B:
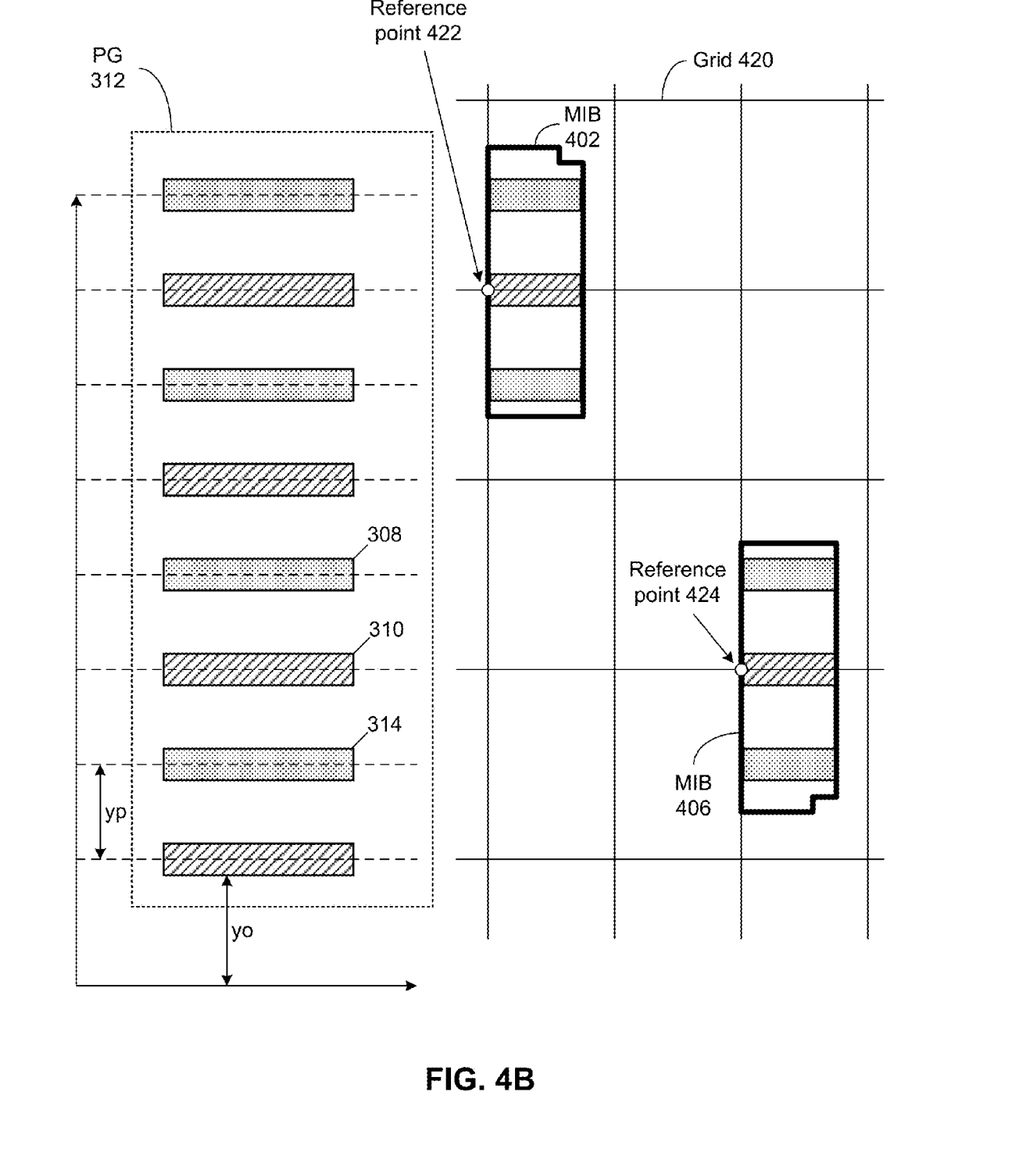
FIG. 4B illustrates an example of how a shaping engine can align a MIB instance using a single grid in accordance with some embodiments described herein.

FIG. 4B illustrates an example of how a shaping engine can align a MIB instance using a single grid in accordance with some embodiments described herein. In some embodiments, the placement constraints can be specified using a single grid. Specifically, the shaping engine can place a physical partition (regardless of the orientation) so that a given reference point on the physical partition is located at a grid point. As shown in FIG. 4B, grid 420 can specify the grid points (each intersection point in grid 420 can be a grid point) that are to be used when placing a MIB instance. The single grid is positioned so that the PG is symmetric with respect to the grid, i.e., the PG will be the same if you flip it across any grid line. Note that PG 312 is symmetric with respect to grid 420.

Once the single grid is determined, any reference point on the MIB instance can be selected to snap to the grid. For example, reference point 422 can be selected in MIB 402 which has an R0 orientation. MIB 402 can be placed using grid 420 by aligning reference point 422 in MIB 402 with a grid point in grid 420. MIB 406 has an MX orientation but it can also be placed using grid 420 by aligning reference point 424 (which is at the same relative location in the MIB) with a grid point in grid 420.

In some embodiments, when the user shapes, moves, and/or sizes a MIB instance, all objects that are to be "pushed" into the MIB (e.g., the PG wires) need to be aligned with respect to each MIB instance. For example, when an electrical connection needs to be created between a PG wire (i.e., the "object") and a circuit element in the MIB, the PG wire needs to be "pushed" into the MIB (note that the PG wires may be "outside" the MIB in the logical hierarchy, and therefore they may need to be "pushed" into the MIB). In these embodiments, the pitch of the MIB grid (i.e., the distance between two lines in the grid in a given direction) is determined by the least common multiple of all of the objects that are to be "pushed" into the block. For example, if a first object repeats every f length units, and a second object repeats every s length units, then the pitch of the grid can be set to be equal to the least common multiple off and s. The origin and offset of the grid can be set by the user when the user specifies which MIB instance is to be used to create the grid. Once the grid origin and offset have been set based on the given MIB instance, multiple variants of the grid can be created to support mirroring. For example, the grid itself can be mirrored and/or rotated with respect to the origin to create grids that correspond to the MX, MY, and R180 variants of the base grid.

In some embodiments, the shaping engine can interact with the MIB grids as follows. As explained above, the user first specifies the objects (e.g., PG wires) that are expected to be "pushed" into the MIB. Next, the grid pitch can be determined based on the objects (e.g., by computing the least common multiple). Next, the shaping engine can select the best MIB instance (e.g., select the best MIB orientation depending on the circuit design context around the MIB instance) and set the grid offset. The shaping engine can then legalize all MIB instances based on the different grids (R0, MX, MY, R180) depending on the orientation of the instance being legalized.

In embodiments where the shaping engine uses MIB grids to place MIB instances, the design flow can be as follows. The design flow can begin with the shaping engine placing all MIB instances based on the appropriate MIB grid (e.g., based on the MIB grid that corresponds to the MIB instance's orientation). Next, the user can move MIB instances (e.g., by using a floorplanning tool's graphical user interface), and the tool can snap the MIB instances to the proper grid, as defined by the shaping engine. If the user changes the orientation of a MIB instance, then the tool can change the grid accordingly, and snap the MIB instance to the new grid.

The tool can also allow the user to redefine the MIB grid via context menus by selecting any MIB instance. Note that when the user redefines the MIB grid based on one of the MIB instances, the other MIB instances may become non-legal because they were placed by the shaping engine based on the older set of grids. In some embodiments, the tool can provide a legalization feature that allows the user to use the redefined grid to legalize the other MIB instances.

Figure 5:
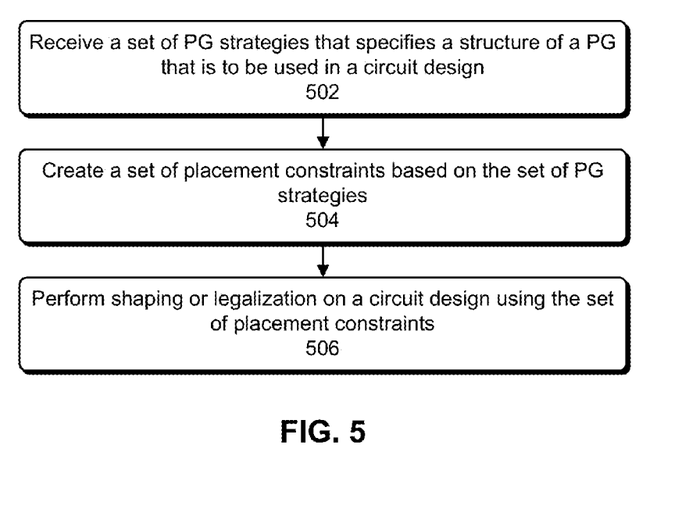
FIG. 5 illustrates a process for performing shaping in accordance with some embodiments described herein.

FIG. 5 illustrates a process for performing shaping in accordance with some embodiments described herein. The process can begin with receiving a set of PG strategies that specifies a structure of a PG that is to be used in a circuit design (operation 502). In some embodiments, the set of PG strategies can specify a start point, a pitch, a direction, and a repeat count for creating the PG. In some embodiments the process can receive additional information in operation 502, such as an alignment option which indicates the type of alignment that is required, and information about metal layers. Next, the process can create a set of placement constraints based on the set of PG strategies (operation 504). The set of placement constraints can be used during shaping and can also be used for legalization (e.g., when the user manually edits the circuit design). In embodiments where additional information is received in operation 502, the process can create the set of placement constraints in operation 504 based on the set of PG strategies and the additional information, e.g., the alignment option and/or the metal layer information. The process can then perform shaping or legalization on a circuit design using the set of placement constraints (operation 506). Specifically, in some embodiments, the process can receive a request to change the shape, size, and/or location of a physical partition in the circuit design. The process can then change the shape, size, and/or location of the physical partition as per the request, and then legalize the modified physical partition based on the set of placement constraints (e.g., by adjusting the location of the modified physical partition so that the set of placement constraints are satisfied). The set of placement constraints can include: (1) a placement constraint that requires a centerline of a physical partition (e.g., a MIB instance) to be aligned with a centerline of a PG wire (see e.g., FIG. 3A), (2) a placement constraint that requires a given edge of a physical partition to have a given offset with respect to a PG wire (see e.g., FIG. 3B), and/or (3) a placement constraint that requires a reference point in a physical partition to be aligned with a grid point of a grid (see e.g., FIG. 4).

Computer System

Figure 6:
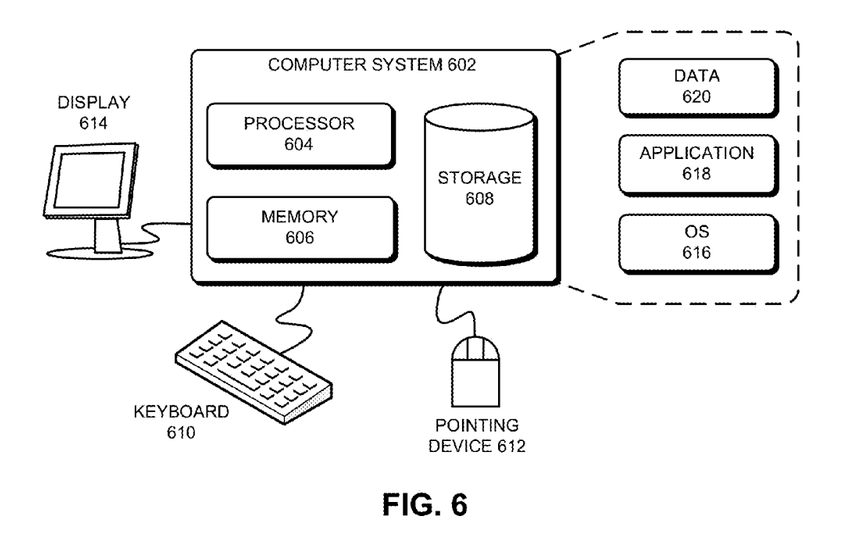
FIG. 6 illustrates a computer system in accordance with some embodiments described herein.

FIG. 6 illustrates a computer system in accordance with some embodiments described in this disclosure. Computer system 602 can include processor 604, memory 606, and storage device 608. Computer system 602 can be coupled to display device 614, keyboard 610, and pointing device 612. Storage device 608 can store operating system 616, application 618, and data 620. Data 620 can include input required by application 618 and/or output generated by application 618.

Computer system 602 may automatically (or with user input) perform one or more processes that are implicitly or explicitly described in this disclosure. For example, computer system 602 can load application 618 into memory 606, and application 618 can then be used to perform shaping that is integrated with PNS for PG alignment.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing shaping on a circuit design, the method comprising:
receiving a set of power grid (PG) strategies that specifies a structure of a PG that is to be used in the circuit design;
creating a set of placement constraints based on the set of PG strategies, wherein the set of placement constraints comprises a placement constraint that requires a physical partition to be aligned with the structure of the PG, and wherein at least one PG wire passes through the physical partition;
performing, by computer, shaping on the circuit design using the set of placement constraints; and
after performing said shaping on the circuit design, creating the PG in the circuit design based on the set of PG strategies, wherein said creating the PG in the circuit design comprises pushing the at least one PG wire into the physical partition.

2. The method of claim 1, further comprising receiving an alignment option, wherein said creating involves creating the set of placement constraints based on the set of PG strategies and the alignment option.

3. The method of claim 1, wherein the set of placement constraints includes a placement constraint that requires a centerline of a physical partition to be aligned with a centerline of a PG wire.

4. The method of claim 1, wherein the set of placement constraints includes a placement constraint that requires a given edge of a physical partition to have a given offset with respect to a PG wire.

5. The method of claim 1, wherein the set of placement constraints includes a placement constraint that requires a reference point in a physical partition to align with a grid point of a grid.

6. The method of claim 1, wherein the set of PG strategies specify a start point, a pitch, a direction, and a repeat count for creating the PG.

7. A non-transitory computer-readable storage medium storing instructions that, when executed by a computer, cause the computer to perform a method for performing shaping on a circuit design, the method comprising:
receiving a set of power grid (PG) strategies that specifies a structure of a PG that is to be used in the circuit design;
creating a set of placement constraints based on the set of PG strategies, wherein the set of placement constraints comprises a placement constraint that requires a physical partition to be aligned with the structure of the PG, and wherein at least one PG wire passes through the physical partition;
performing shaping on the circuit design using the set of placement constraints; and
after performing said shaping on the circuit design, creating the PG in the circuit design based on the set of PG strategies, wherein said creating the PG in the circuit design comprises pushing the at least one PG wire into the physical partition.

8. The non-transitory computer-readable storage medium of claim 7, wherein the method further comprises receiving an alignment option, wherein said creating involves creating the set of placement constraints based on the set of PG strategies and the alignment option.

9. The non-transitory computer-readable storage medium of claim 7, wherein the set of placement constraints includes a placement constraint that requires a centerline of a physical partition to be aligned with a centerline of a PG wire.

10. The non-transitory computer-readable storage medium of claim 7, wherein the set of placement constraints includes a placement constraint that requires a given edge of a physical partition to have a given offset with respect to a PG wire.

11. The non-transitory computer-readable storage medium of claim 7, wherein the set of placement constraints includes a placement constraint that requires a reference point in a physical partition to align with a grid point of a grid.

12. The non-transitory computer-readable storage medium of claim 7, wherein the set of PG strategies specify a start point, a pitch, a direction, and a repeat count for creating the PG.

13. A method for performing legalization on a circuit design, comprising:
receiving a set of power grid (PG) strategies that specifies a structure of a PG that is to be used in the circuit design;
creating a set of placement constraints based on the set of PG strategies, wherein the set of placement constraints comprises a placement constraint that requires a physical partition to be aligned with the structure of the PG, and wherein at least one PG wire passes through the physical partition;
legalizing, by computer, the circuit design using the set of placement constraints; and
after performing said legalizing on the circuit design, creating the PG in the circuit design based on the set of PG strategies, wherein said creating the PG in the circuit design comprises pushing the at least one PG wire into the physical partition.

14. The method of claim 13, wherein the method further comprises receiving an alignment option, wherein said creating involves creating the set of placement constraints based on the set of PG strategies and the alignment option.

15. The method of claim 13, wherein the set of placement constraints includes a placement constraint that requires a centerline of a physical partition to be aligned with a centerline of a PG wire.

16. The method of claim 13, wherein the set of placement constraints includes a placement constraint that requires a given edge of a physical partition to have a given offset with respect to a PG wire.

17. The method of claim 13, wherein the set of placement constraints includes a placement constraint that requires a reference point in a physical partition to align with a grid point of a grid.

18. The method of claim 13, wherein the set of PG strategies specify a start point, a pitch, a direction, and a repeat count for creating the PG.

* * * * *